L. S. LACHMAN.
METAL VEHICLE WHEEL.
APPLICATION FILED JULY 31, 1918.
1,393,796.
Patented Oct. 18, 1921.
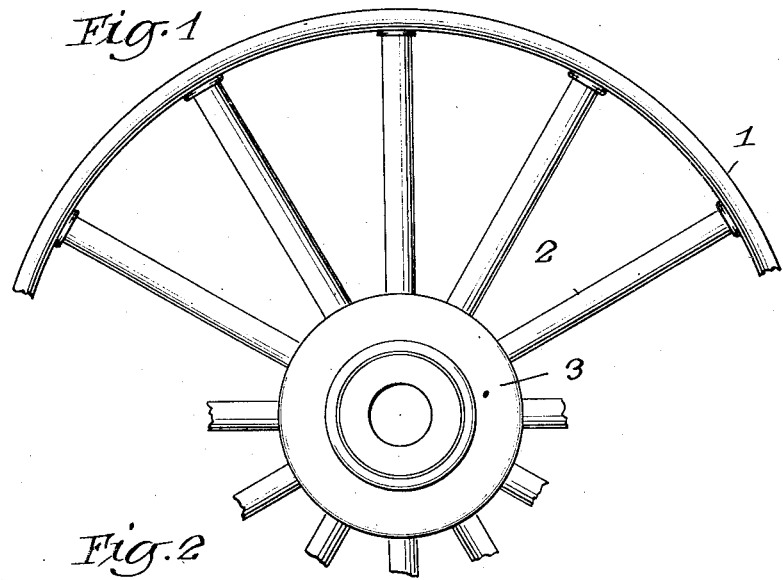
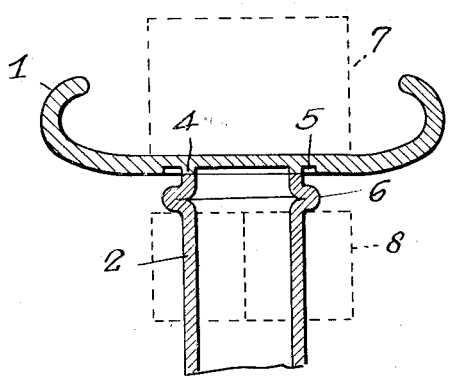
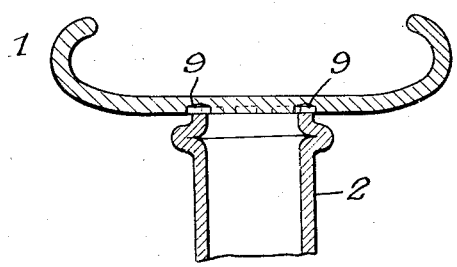
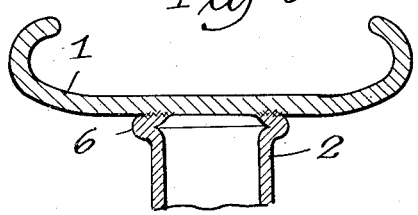
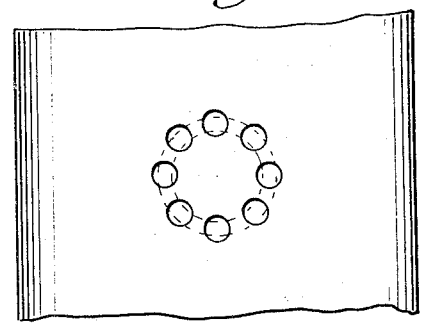
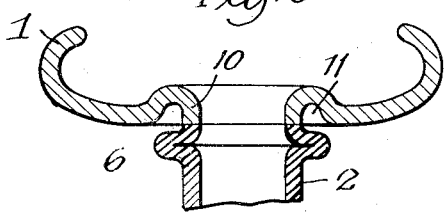
INVENTOR
Laurence S. Lachman
BY
Townsend & Decker
ATTORNEYS

UNITED STATES PATENT OFFICE.

LAURENCE S. LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METAL VEHICLE-WHEEL.

1,393,796.  Specification of Letters Patent.  Patented Oct. 18, 1921.

Application filed July 31, 1918. Serial No. 247,499.

*To all whom it may concern:*

Be it known that I, LAURENCE S. LACHMAN, a citizen of the United States, and a resident of New York, in the county of New York and State of New York, have invented certain new and useful Improvements in Metal Vehicle-Wheels, of which the following is a specification.

This invention relates to the construction of metal vehicle wheels having metal spokes and a metal rim or felly with which the spoke ends are joined by welding.

The object of the invention is to construct a metal wheel with spokes consisting of metal tubes and to secure the spokes to the rim with maximum strength and at minimum cost by an electric welding operation and also to conceal the union of the spoke and rim by a collar or flange surrounding the spoke at its point of union with the rim.

To these ends the invention consists in the method of constructing metal vehicle wheels having tubular spokes and metal rim or felly by providing the rim with projections on its inner surface for each spoke and a countersink in the inner surface of the rim surrounding the projection, providing each tubular spoke near its end with an annular flange or collar, assembling the spoke and rim with the spoke engaging the projection and applying welding current and pressure to weld the end of the spoke to the rim, to cause the upset metal of the joint to be displaced into the countersink and to bring the flange or collar on the tubular spoke against the surface of the rim so as to close the countersink and conceal the upset metal.

The invention further consists in the details of the process and in the metal wheel, product of that process as hereinafter more particularly described and claimed.

In the accompanying drawings, Figure 1 is a side elevation of a wheel embodying this invention, a portion of the wheel being broken away.

Fig. 2 is an enlarged vertical transverse section through the rim at the place of union of the tubular spoke therewith; the parts being shown in position ready for welding.

Fig. 3 is a similar view showing the joint after completion of the welding operation.

Fig. 4 is a plan of a portion of the rim, looking at the inner surface thereof and showing an alternate manner of preparing the rim for the welding operation.

Fig. 5 is a vertical transverse section through the rim and a spoke assembled for joining and utilizing the form of rim preparation shown in Fig. 4.

Fig. 6 shows a further modification of the invention.

1 indicates a metal rim shown in the present case as adapted to receive an inflated tire. 2 indicates tubular spokes secured to the hub 3 in any well known or suitable manner.

The rim 1 is provided, at each place it is desired to secure a spoke, with a portion or portions isolated or partially isolated from the main inner surface of the rim. Preferably this isolation is formed by providing a countersink in the rim. Preferably, also, the isolated part does not project beyond the inner surface of the rim.

In Fig. 2, the isolated portion is shown as in the form of an annular ridge or rib 4 of the same diameter as the end of the tubular spoke 2. The ridge may be formed in any desired manner as by coin-stamping it or otherwise, the ridge being surrounded by a groove 5.

The tubular spoke is provided with an annular swell or flange on the periphery indicated at 6 thereof and preferably integral with the tube.

The welded union of the end of the tubular spoke and the ridge 4 is produced by engaging the end of the tube against the ridge and assembling the parts between electric current supplying blocks indicated in dotted lines at 7 and 8. Current in passing from one block to the other heats the parts at the engagement and as the material softens pressure is applied in line with the blocks, which causes the end of the tube and the ridge to consolidate and weld the parts into substantially the form shown in Fig. 3, the burr due to the upsetting pressure filling in the groove 5. The final upsetting pressure causes the flange 6 to seat against the surface of the rim, thus closing the groove 5 and concealing the rough metal of the burr located therein.

The advantage in forming the portion of the rim to which the spoke is welded by a coining operation as indicated in Fig. 2 is that the outer surface of the rim remains smooth and does not interfere with the inner tube for the tire.

Referring to Figs. 4 and 5, portions of the inner surface of the rim 1 are partially isolated from the main surface by boring or otherwise forming a number of annularly arranged spaced apart holes 9 which by preference do not perforate the rim.

In assembling the parts the end of the spoke contacts with the metal between the holes 9 as indicated in dotted lines in Fig. 4 and the parts are welded in the same manner as heretofore described, the upset metal being forced into the holes. The flange 6 conceals any rough edges in the finished weld as in the previous case.

In the modification shown in Fig. 6 the isolated portion of the rim consists of a flange or ridge 10 formed by perforating the rim and depressing a groove 11 therein which surrounds the flange and takes the upset metal due to the welding operation, the flange 6 of the tube in the finished joint concealing this groove as in the case of the form shown in Figs. 2 and 3.

When the annular flange or enlargement 6 is formed integral with the tube 2 it is preferably made by the process of electric forging wherein the section to be formed is heated by an electric current passing through the tube and the tube is subjected to end pressure after the metal at the point of upsetting or enlargement has reached the desired plasticity.

It will be understood that modifications in the manner of carrying out the invention may be resorted to without departing from the spirit thereof as expressed in the appended claims.

What I claim as my invention is:

1. The herein described process of making a metal wheel having metal rim and tubular spokes united therewith each by a welded joint, consisting in providing the inner surface of the metal rim with projections, surrounding each by a countersink on the inner surface, providing each tubular spoke with a flange or collar near its end to be welded, assembling the parts with the end of the tubular spokes engaging each against its projection on the rim and applying welding current and pressure to weld the tubular spokes to the rim and cause the upset metal to be received in the countersink and cause the flange or collar on the spoke to engage the inner surface of the rim and conceal the metal of the welded joint.

2. The herein described process of manufacturing a metal wheel having a metal rim and tubular spokes united therewith by a homogeneous butt-welded joint involving metal of the rim and spoke, consisting in providing the inner surface with an isolated projection not projecting beyond the inner peripheral surface thereof, abutting the end of the tubular spoke against the said projection by its edge and applying pressure to weld the spoke to the rim and cause the metal displaced by the operation to be received in the space providing the isolation.

3. The herein described method of manufacturing a metal wheel having a metal rim and tubular spokes united therewith by a homogeneous welded joint, consisting in providing the inner surface of the rim with isolated projections flush with the inner peripheral surface, assembling the tubular spoke with its edge butted against said projection and applying welding current and endwise pressure to the spoke.

4. The herein described method of constructing a metal wheel having metal rim and tubular spokes united directly therewith, consisting in providing the spoke with an annular enlargement or collar near its end, engaging the end with the inner surface of the rim and applying heating current and end pressure to weld the spoke and rim together and to bring the annular flange or enlargement against the surface of the rim so as to conceal the rough metal of the joint.

5. The herein described method of constructing a metal wheel having a metal rim and a tubular spoke united therewith by a homogeneous welded joint, consisting in providing the inner surface of the rim with a welding projection and a surrounding depression, providing a spoke having a surrounding flange near its end, abutting the end of the spoke against the edge of the projection and applying heating current and end pressure to unite the end of the spoke to said projection and cause the upset metal to be displaced into the depression and to cause the flange to seat against the surface of the rim, thus closing the depression and concealing the rough metal of the weld.

6. The herein described method of constructing a metal wheel having a metal rim and a tubular spoke united therewith by a homogeneous welded joint, consisting in providing the inner surface of the rim with a welding projection and surrounding depression, providing a spoke having a surrounding flange near its end integral with the spoke, abutting the end of the spoke against the edge of the projection and applying heating current and end pressure to unite the end of the spoke to said projection and cause the upset metal to be displaced into the depression and to cause the flange to seat against the end of the surface of the rim, thus closing the depression and concealing the rough metal of the weld.

7. In a metal wheel, a metal rim and tubular spokes united therewith by a welded joint comprising the metal of projections integral with and rising from countersinks in the inner surface of the rim and the ends of the spokes butt-welded to said projections.

8. A metal wheel having a metal rim and tubular spokes united therewith by a homogeneous butt-welded joint comprising metal of a portion of the rim integral therewith but not projecting beyond the inner peripheral surface thereof and the end of the tubular spoke butt-welded to said projection by its edge.

9. A metal wheel having a metal rim and tubular spokes united therewith by a homogeneous welded joint comprising metal of an isolated projection upon the inner surface of said rim flush with the inner peripheral surface and the metal of the spoke end welded directly to said projection by the edge of said tubular spoke.

10. A metal wheel having a metal rim and tubular spokes united with said rim by a homegeneous welded joint comprising metal of the rim integral therewith and the edge of the tubular spoke and butt-welded thereto, the bur or upset metal of said joint being concealed by a flange around said spokes.

11. A metal wheel having a metal rim and tubular spokes united therewith by a joint comprising a portion of the rim at the inner surface thereof integral therewith and constituting a countersunk isolated portion and the metal of the end of the spoke butt-welded by its edge to said countersunk portion, said spoke being provided with a flange adapted to cover the countersink and conceal the bur or extruded metal of the joint.

12. A metal wheel having a metal rim and a tubular spoke united therewith by a homogeneous welded joint including a projection on the inner surface of the rim integral therewith but separated from said surface by a depression and the metal of the edge of the tubular spoke butt-welded to said projection and having a flange covering said depression and concealing the bur or extruded metal of the joint.

13. A metal wheel having a metal rim and a tubular spoke united therewith by a homogeneous welded joint including a projection on the inner surface of the rim integral therewith but separated from said surface by a depression and the metal of the edge of the tubular spoke butt-welded to said projection and having a flange integral with the spoke, covering said depression and concealing the bur or extruded metal of the joint.

14. In a metal wheel, a metal rim and tubular spoke united therewith by a homogeneous welded joint embracing metal of an annular ridge countersunk in the inner surface of the rim and integral therewith and the metal of the spoke butt-welded by its end to said ridge and provided with an annular flange adapted to cover the bur or extruded metal of the welded joint.

Signed at New York, in the county of New York and State of New York, this 18th day of July A. D. 1918.

LAURENCE S. LACHMAN.

Witnesses:
F. G. TOWNSEND,
F. E. ROESLER.